(12) United States Patent
Hong et al.

(10) Patent No.: US 8,581,815 B2
(45) Date of Patent: Nov. 12, 2013

(54) DISPLAY DEVICE

(75) Inventors: Hyung Ki Hong, Seoul (KR); Hee Jin Im, Anyang-si (KR)

(73) Assignee: LG Display Co., Ltd., Seoul (KR)

(*) Notice: Subject to any disclaimer, the term of this patent is extended or adjusted under 35 U.S.C. 154(b) by 1176 days.

(21) Appl. No.: 12/289,336

(22) Filed: Oct. 24, 2008

(65) Prior Publication Data
US 2009/0109154 A1    Apr. 30, 2009

(30) Foreign Application Priority Data

Oct. 24, 2007  (KR) .................. 10-2007-0107241

(51) Int. Cl.
*G09G 3/36* (2006.01)

(52) U.S. Cl.
USPC ............ 345/87; 345/30; 345/55; 345/82; 345/88

(58) Field of Classification Search
None
See application file for complete search history.

(56) References Cited

U.S. PATENT DOCUMENTS

| | | | |
|---|---|---|---|
| 6,215,542 B1* | 4/2001 | Lee et al. | 349/143 |
| 2003/0053018 A1* | 3/2003 | Ono | 349/129 |
| 2004/0222945 A1* | 11/2004 | Taira et al. | 345/6 |
| 2006/0176424 A1* | 8/2006 | Kajita et al. | 349/96 |
| 2007/0013624 A1* | 1/2007 | Bourhill | 345/84 |
| 2007/0139333 A1* | 6/2007 | Sato et al. | 345/90 |

FOREIGN PATENT DOCUMENTS

JP    2004-258631    9/2004

* cited by examiner

*Primary Examiner* — Sumati Lefkowitz
*Assistant Examiner* — Jesus Hernandez
(74) *Attorney, Agent, or Firm* — McKenna Long & Aldridge LLP

(57) ABSTRACT

Disclosed is a display device adapted to selectively display a normal image, a stereoscopic image, a multi-view image and a stereoscopic multi-view image is disclosed. The display device includes a liquid crystal panel displaying an image; a polarizer disposed on the liquid crystal panel; a liquid crystal lens disposed on the polarizer; and a polarizing member interposed between the liquid crystal lens and the liquid crystal panel, wherein an axis of light transmitted through the liquid crystal lens coincides with an optical axis of the polarizer. Accordingly, the display device can selectively display a normal image, a stereoscopic image, a multi-view image and a stereoscopic multi-view image, while improving the picture quality and the brightness.

11 Claims, 3 Drawing Sheets

DISPLAY DEVICE

This application claims the benefit of Korean Patent Application No. 10-2007-0107241, filed on Oct. 24, 2007, which is hereby incorporated by reference for all purposes as if fully set forth herein.

BACKGROUND OF THE INVENTION

1. Field of the Invention

The present invention relates to a display device, and more particularly to a display device that is adapted to selectively display a normal image, a stereoscopic image and a multi-view image.

2. Discussion of the Related Art

Nowadays, as the standard of living rapidly improves, there is an increasing demand for the diversification of functions of the electronic equipment that is used. In particular, display devices that display images are required to have a stereoscopic image function in which the display device displays 3D-images, or to have a multi-view function in which another image is displayed with a different viewing angle on one screen. The stereoscopic image function or the multi-view function is widely required in a variety of fields, such as advertising, educational training, entertainment, and navigations.

In order to provide the stereoscopic image function or the multi-view function to the display device, the display device includes a display panel displaying images, and a barrier that divides the image provided at the display panel into at least first and second images.

The display panel might be a liquid crystal panel that can be made light and thin and of which the power consumption is low. The liquid crystal panel includes first and second substrates, a liquid crystal layer interposed between the two substrates, and a polarizer that is adhered to the outer side surface of at least one of the first and second substrates.

The barrier includes a light shielding part that intercepts light and a light transmission part through which light is transmitted. However, when using the barrier, there is a disadvantage in that only the stereoscopic image or the multi-view image can be displayed.

For the implementation of a display device capable of selectively displaying the normal images and one of the stereoscopic images and multi-view images, a technique has been developed that replaces the barrier by a liquid crystal lens which makes changes to a refractive index in accordance with an electric field.

The liquid crystal lens includes first and second substrates and a liquid crystal interposed between the two substrates. The first and second substrates each include first and second electrodes.

Such a liquid crystal lens is tilted at a fixed angle with respect to the vertical direction of the liquid crystal panel, in order to display the multi-view image. Due to this, the optical axis of the polarizer of the liquid crystal panel might be greatly different from the axis of the light passing through the liquid crystal lens. As the difference between the optical axis of the polarizer and the optical axis of the liquid crystal lens becomes larger, cross-talk might be generated, and the picture quality may also be deteriorated.

Moreover, there is another disadvantage in that the picture quality of the stereoscopic image or the dual-view image might be deteriorated further because the optical axis of the liquid crystal lens and the optical axis of the liquid crystal panel become different from each other according to the alignment direction of the liquid crystal lens.

As a result, it is possible to selectively display the normal images and one of the stereoscopic images, the multi-view images, and the stereoscopic multi-view images by use of the liquid crystal lens. However, a problem is generated in that the picture quality thereof is deteriorated by the optical property of the liquid crystal lens.

SUMMARY OF THE INVENTION

Accordingly, the present embodiments are directed to a display device that substantially obviates one or more problems due to the limitations and disadvantages of the related art.

An advantage of the present embodiment is to provide a display device that is adaptive for selectively displaying a normal image, a stereoscopic image, a multi-view image and a stereoscopic multi-view image as well as resolving the picture quality deterioration problem.

Additional features and advantages of the invention will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general advantage of the present invention, a display device includes: a liquid crystal panel for displaying an image; a polarizer disposed on the liquid crystal panel; a liquid crystal lens disposed on the polarizer; and a polarizing member interposed between the liquid crystal lens and the liquid crystal panel, wherein an axis of light transmitted through the liquid crystal lens coincides with an optical axis of the polarizer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the principles of the invention.

In the drawings.

DETAILED DESCRIPTION OF THE ILLUSTRATED EMBODIMENTS

Reference will now be made in detail to the embodiments of the present disclosure, examples of which are illustrated in the accompanying drawings.

Figure 1:
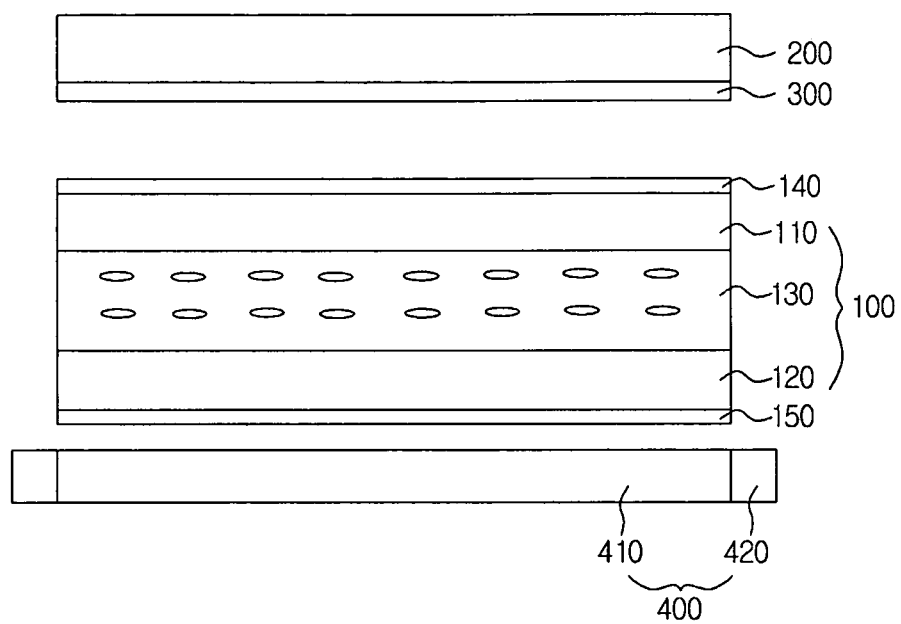
FIG. 1 is a cross sectional view showing a display device according to an embodiment of the present invention.

FIG. 1 is a cross sectional view showing a display device according to an embodiment of the present disclosure. Referring to FIG. 1, the display device includes a unit that displays the polarized light.

A liquid crystal panel 100 may be used, for example, as the unit. The liquid crystal panel 100 includes a TFT (Thin Film Transistor) substrate 120 and a color filter substrate 110 which face each other. A liquid crystal layer 130 is interposed between the TFT substrate 120 and the color filter substrate 110.

The TFT substrate 120 includes gate lines and data lines which cross each other, thin film transistors each disposed at the crossing parts of the gate lines and the data lines, and pixel electrodes which are electrically connected to the thin film transistor, though they are not shown in the drawing.

The color filter substrate 110 includes a black matrix that corresponds to the gate lines, the data lines and the thin film transistors, color filter patterns disposed at regions which are exposed by the black matrix, and a common electrode disposed on the black matrix and the color filter patterns.

In an embodiment of the present disclosure, the mode of the liquid crystal panel may be, for example a TN (Twisted Nematic) mode in which liquid crystal molecules are twisted, but it is not limited thereto. For example, the liquid crystal panel 100 may be of a VA (vertical alignment) mode allowing the liquid crystal molecules to be vertically aligned-to the TFT substrate 120, or of an IPS (In Plane Switching) mode allowing the liquid crystal molecules to be horizontally aligned with respect to the TFT substrate 120.

First and second polarizers 150 and 140 each having optical axes which are orthogonal to each other are disposed at the outer side surface of the color filter substrate 110 and the TFT substrate 120, respectively.

The liquid crystal panel 100 includes a plurality of pixels which are defined by the crossing of the gates line and the data lines. The pixels might provide first and second images which are different from each other. For example, when the display device displays a stereoscopic image, the first and second images may be images for the left and right eyes. On the other hand, when a dual view image is displayed on the display device, the first and second images may be the images which are displayed in first and second viewing-angle directions that are different from each other.

The display device also includes a backlight assembly 400 disposed at a rear surface of the liquid crystal panel 100. The backlight assembly 400, includes a light source 420 that generates light, and a light guide plate 410 that guides lights to the liquid crystal panel 100. Additionally, the backlight assembly 400 might further include a reflection plate and optical sheets, though they are not shown in the drawing. The reflection plate may be disposed at the rear surface of the light guide plate 410 and reflects any light that leaks in an opposite direction to the liquid crystal panel 100. The optical sheets might include a prism sheet that is disposed at a front surface of the light guide plate 410 and condenses the lights provided from the light guide plate 410 to the liquid crystal panel 100, and a diffusion sheet that is disposed on the prism sheet and uniformly provides the condensed lights from the prism sheet to the liquid crystal panel 100.

The display device further includes a liquid crystal lens 200 that divides into first and second images which are provided from the liquid crystal panel 100.

Figure 2:
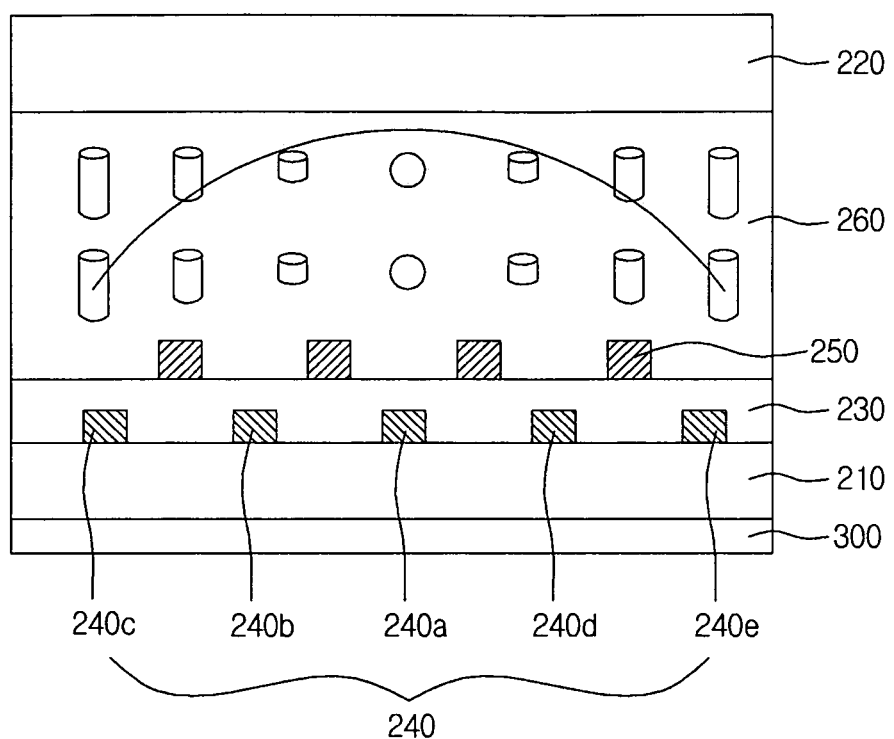
FIG. 2 is a cross sectional view showing a liquid crystal lens in FIG. 1.

FIG. 2 is a cross sectional view showing a liquid crystal lens. Referring to FIGS. 1 and 2, the liquid crystal lens 200 includes first and second substrates 210, 220 which face each other, and a liquid crystal layer 260 interposed between the first and second substrates 210, 220.

The liquid crystal lens 200 controls the refractive index by regions by use of electric field.

To this end, the liquid crystal lens 200 includes a plurality of pixel electrodes 240 that are separately arranged from each other on the first substrate 210, an insulation film 230 disposed on the first substrate 210 including the pixel electrodes 240, and a plurality of common electrodes 250 that are alternately arranged with the pixel electrodes 240 on the insulation film 230. The pixel electrodes 240 include a first electrode 240a receiving a first voltage, and second and third electrodes 240b and 240c which are disposed at one side of the first electrode 240a and respectively receive a second voltage lower than the first voltage and a third voltage lower than the second voltage. Further, fourth and fifth electrodes 240d, 240e each receiving the second and third voltages are disposed at the other side of the first electrode 240a. At this time, the same voltage is applied to the common electrodes 250. In case of applying the different voltages to the pixel electrodes 240 and the common electrode respectively, since the liquid crystal molecules of the liquid crystal lens 200 might be arranged in an elliptical shape, the liquid crystal lens 200 can have the shape of a convex lens. In other words, the liquid crystal lens 200 arranges the liquid crystal molecules of a liquid crystal layer 260 in the lens shape, thereby changing the refractive index of the passing light through the liquid crystal lens area by area. Accordingly, it generates the parallax of the light transmitted through the liquid crystal lens 200, thus a stereoscopic image can be displayed. Contrary to this, when not applying voltage to the liquid crystal lens 200, the image transmitted through the liquid crystal lens 200 might be displayed as a normal image.

In addition thereto, the liquid crystal lens 200 might display a dual-view image, which provides different images in one screen, by way of condensing the provided image from the liquid crystal panel 100 in at least two directions, for example, in first and second view-angle directions.

In these manners, the liquid crystal lens 200 might selectively display the image provided from the liquid crystal panel 100 as the normal image, the stereoscopic image, the multi-view image and the stereoscopic multi-view image.

In the embodiment of the present invention, the liquid crystal lens 200 was explained to have the pixel electrodes to which symmetrical voltage on the basis of one pixel electrode is applied, but it is not limited thereto, and the liquid crystal display lens 200 might have various shapes in the pixel electrodes 240.

The liquid crystal lens 200 might include an alignment film formed on at least one of the inner side surfaces of the first and second substrates 210, 220 for initially aligning the liquid crystal molecules of the liquid crystal layer 260.

Depending on an alignment direction of the alignment film of the liquid crystal lens 200, an optical axis of the liquid crystal lens 200 might be different from an optical axis of a second polarizer 140 on the liquid crystal panel 100. Also, in case the liquid crystal alignment pattern of the liquid crystal lens 200 is different from the liquid crystal alignment pattern of the liquid crystal panel 100, the axis of the light transmitted through the liquid crystal panel 100 might be different from the axis of the light transmitted through the liquid crystal lens 200.

Furthermore, in order for the display device to display the dual-view image and to prevent the picture quality deterioration, e.g., crosstalk defect, the liquid crystal lens 200 has an angle uniformly tilted in relation to the second polarizer 140 of the liquid crystal panel 100. Due to this, the optical axis of the liquid crystal lens 200 might be different from the optical axis of the second polarizer 140.

In this way, in case the optical axis of the second polarizer 140 is different from the optical axis of the liquid crystal lens 200, there is a problem in that the picture quality is deteriorated.

In order to resolve this problem, a polarizing member 300 is interposed between the liquid crystal lens 200 and the liquid crystal panel 100. The polarizing member 300 might be a fixed polarizing film. The polarizing film might have the same transmission axis as the liquid crystal lens. Hereby, the axis of the light transmitted from the liquid crystal panel 100 is made to coincide with the optical axis of the liquid crystal lens by the polarizing member 300, thereby it is possible to prevent the picture quality of the display device from being deteriorated.

The material to be used as the polarizing film might include an expanded poly-vinyl-alcohol group film.

In case that the polarizing member 300 is used as the polarizing film, the picture quality of the display device might be improved. However, the polarizing member 300 of the polarizing film forces the image from the liquid crystal panel 100 being primarily polarized at the second polarizer 140 before being secondarily polarized at the polarizing member 300, thus the brightness thereof can be reduced to at least 50% of the brightness provided at the liquid crystal panel 100.

In order to improve the brightness of the display device, as well as improving the picture quality of the display device, the polarizing member 300 might be a compensation film. In case the polarizing member 300 is the compensation film, the compensation film might be an a-plate type capable of changing the route of light. In this way, the compensation film changes the route of light, thus it is possible to prevent the brightness from being deteriorated.

If the compensation film has a phase difference of $\lambda/2$ and an optical axis of which the angle to its incident linear polarization light is $\theta°$, the linear polarization light transmitted through the compensation film rotates at an angle of $2\theta°$. Accordingly, the compensation film may have an optical axis angle which allows an angle difference between it and the optical angle of the liquid crystal lens 200 to correspond to $\frac{1}{2}$ of the angle difference between the optical axes of the liquid crystal lens 200 and the liquid crystal panel 100.

The compensation film might be made of a high polymer film or UV curing type liquid crystal film.

In the embodiment of the present disclosure, the polarizing member 300 was explained to be disposed at one side surface of the liquid crystal lens 200, but it is not limited thereto, and the polarizing member 300 might be disposed in the second polarizer 140.

In addition thereto, an adhesion layer is interposed between the polarizing member 300 and the liquid crystal lens 200 so that the polarizing member 300 might be stuck onto the liquid crystal lens 200, though it was not shown in the drawing.

Figure 3:
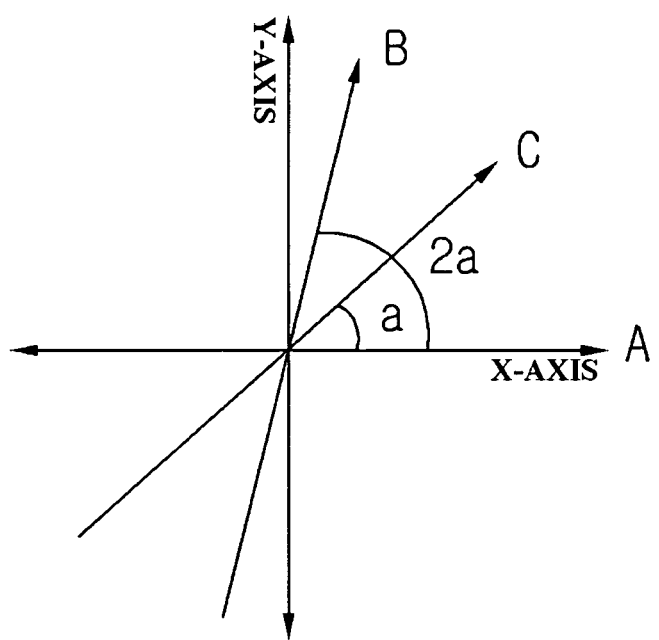
FIG. 3 is a diagram explaining the optical axes of some elements in the display device according to the embodiment of the present invention.

FIG. 3 is a diagram explaining the optical axes of some elements in the display device according to the embodiment of the present disclosure.

Referring to FIG. 3, the optical axis A of the liquid crystal lens 200 is 0° to the X-axis and the optical axis B of the second polarizer 140 on the panel 100 might be tilted at an angle of "2a°" to the X-axis. At this moment, the optical axis B of the second polarizer 140 might be made to coincide with the optical axis A of the liquid crystal lens 200 in case the optical axis C of the compensation film is tilted at the angle of "a°" to the X-axis. This is because the linear polarization light rotate from the optical axis of $\theta°$ to the optical axis of $2\theta°$ in the case of the linear polarization light being transmitted through the compensation film.

Therefore, in relation to selectively materializing the normal image, the stereoscopic image, the multi-view image and the stereoscopic multi-view image by use of the liquid crystal lens, the display device according to the embodiment of the disclosure includes the polarizing member to make the optical axes of the liquid crystal panel and the liquid crystal lens coincide with each other, thereby resolving the picture quality deterioration matter caused by crosstalk.

In addition thereto, the polarizing member is formed of the compensation film, thus the picture quality deterioration matter and the brightness of the display device might both be improved.

As described above, the display device according to an embodiment of the present disclosure might include the liquid crystal lens, which might change the refractive index in accordance with electric fields, thereby selectively displaying the normal image, the stereoscopic image and the multi-view image. Moreover, the liquid crystal lens might include the polarizing member in order to prevent the crosstalk defect. Furthermore, the liquid crystal lens might include the compensation film to increase the brightness and to prevent the generation of crosstalk, thereby improving the picture quality deterioration matter.

It will be apparent to those skilled in the art that various modifications and variations can be made in the present invention without departing from the spirit or scope of the invention. Thus, it is intended that the present invention cover the modifications and variations of this embodiment provided they come within the scope of the appended claims and their equivalents.

What is claimed is:

1. A display device comprising:
a liquid crystal panel displaying an image;
a polarizer disposed on the liquid crystal panel;
a liquid crystal lens disposed on the polarizer for controlling a refractive index by regions of the liquid crystal panel by use of electric field; and
a polarizing member interposed between the liquid crystal lens and the liquid crystal panel, wherein an axis of light transmitted through the liquid crystal lens coincide with an optical axis of the polarizer,
wherein the liquid crystal lens includes a first and a second substrates, which face each other, and a liquid crystal layer interposed between the first and the second substrates,
wherein the liquid crystal lens further comprises a plurality of pixel electrodes that are separately arranged from each other on the first substrate, an insulation film disposed on the first substrate, and a plurality of common electrodes that are alternately arranged with the pixel electrodes on the insulation film, and
wherein the plurality of pixel electrodes comprise a first electrode receiving a first voltage, and a second and a third electrodes which are disposed at one side of the first electrode, and respectively receive a second voltage lower than the first voltage and a third voltage lower than the second voltage.

2. The display device claimed as claim 1, wherein the polarizing member is a compensation film.

3. The display device claimed as claim 2, wherein the compensation film is of an a-plate type.

4. The display device claimed as claim 2, wherein a difference between the optical axis of the polarizer and an optical axis of the liquid crystal lens is an angle twice as large as an angle corresponding to a difference between an optical axis of the compensation film and the optical axis of the polarizer.

5. The display device claimed as claim 1, wherein the polarizing member is a polarizing film.

6. The display device claimed as claim 1, wherein the polarizing member is adhered to the liquid crystal lens which faces the polarizer.

7. The display device claimed as claim 1, wherein the polarizing member is adhered to the polarizer.

8. The display device claimed as claim 1, wherein the plurality of pixel electrodes further comprise a fourth and a fifth electrodes each receiving the second and the third voltages disposed at the other side of the first electrode.

9. The display device claimed as claim 1, wherein a liquid crystal molecules of the liquid crystal lens are arranged in an elliptical shape when a different voltages to the pixel electrodes and the common electrode respectively.

10. The display device claimed as claim 9, wherein the liquid crystal lens has a convex shape.

11. The display device claimed as claim 1, wherein the liquid crystal lens selectively displays a dual-view image, which provides different images, by way of condensing the provided image from the liquid crystal panel in at least two directions.

* * * * *